C. W. CROGAN.
TAPE MEASURE.
APPLICATION FILED DEC. 16, 1916.
1,233,034.
Patented July 10, 1917.
2 SHEETS—SHEET 1.
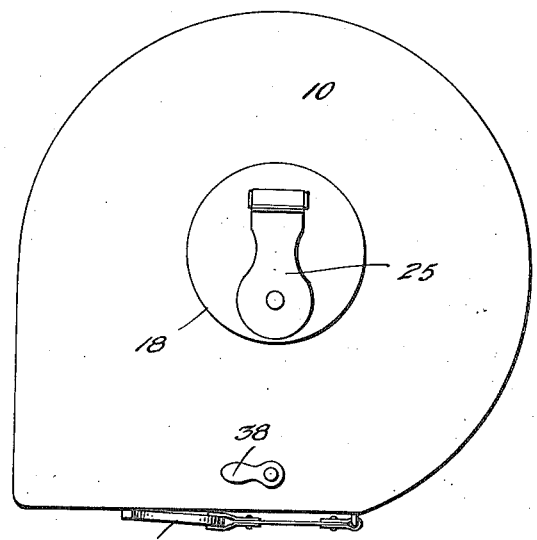
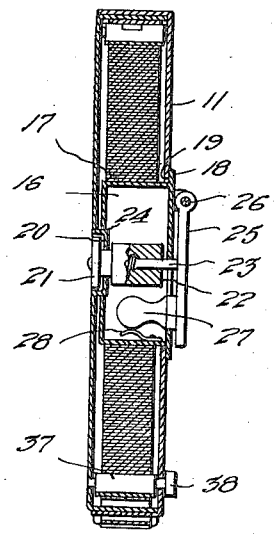
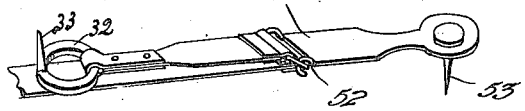
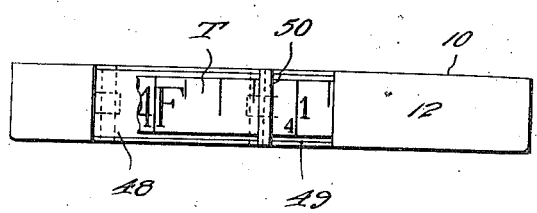
Chas. W. Crogan,
Inventor
By Geo. P. Himmel,
Attorney C. W. CROGAN.
TAPE MEASURE.
APPLICATION FILED DEC. 16, 1916.
1,233,034.
Patented July 10, 1917.
2 SHEETS—SHEET 2.
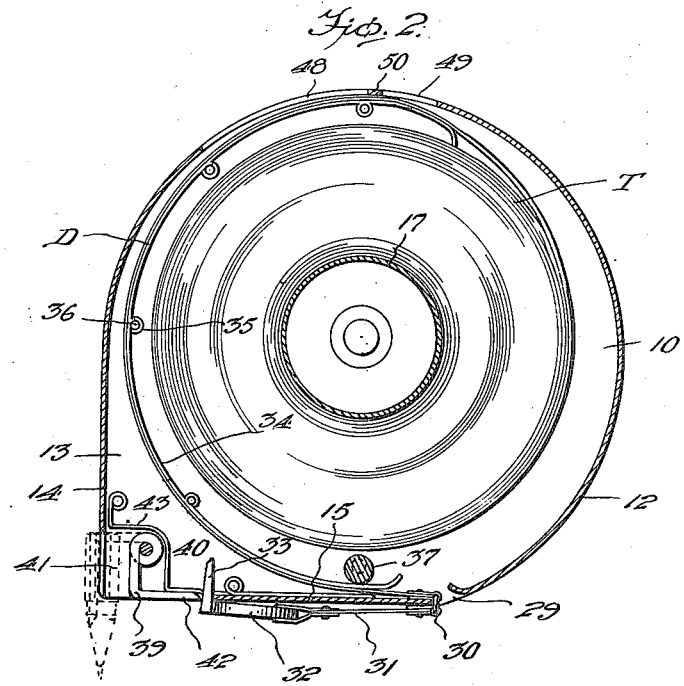
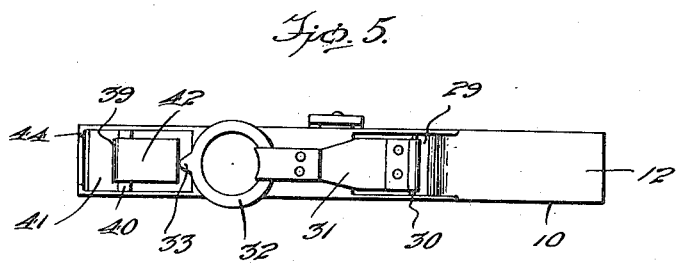
Chas. W. Crogan,
Inventor

UNITED STATES PATENT OFFICE.

CHARLES W. CROGAN, OF BANGOR, MAINE.

TAPE-MEASURE.

1,233,034.

Specification of Letters Patent.

Patented July 10, 1917.

Application filed December 16, 1916. Serial No. 137,423.

*To all whom it may concern:*

Be it known that I, CHARLES W. CROGAN, a citizen of the United States, and resident of Bangor, in the county of Penobscot and State of Maine, have invented certain new and useful Improvements in Tape-Measures, of which the following is a specification.

The present invention relates to tape measures and has particular reference to a new and improved arrangement of the same in which a strong and durable structure is afforded, a device cheap to manufacture, and one accurate and effective in operation.

The primary object of my invention is to provide a tape measure of the reel or winding type having means for making linear measurements, an accurate stop and indicating means being provided.

Another object of my invention is to provide means in conjunction with my improved tape measure whereby the same may be employed for striking circles without any alterations whatsoever in the structure of the device.

A further object of my invention is to provide new and improved guiding means for the measuring tape, whereby to cause the same to move with the utmost freedom.

A still further object of my invention is to provide means for clamping the tape after a measurement has been made, so that the result may be reserved for further reference.

Other objects and advantages to be derived from the use of my improved tape measure will appear from the following detailed description and the claims, taken with an inspection of the accompanying drawings, in which:

Figure 1 is a side elevational view of a tape measure embodying the improvements of my invention;

Fig. 2 is a vertical longitudinal sectional view through the same;

Fig. 3 is a vertical transverse sectional view;

Fig. 4 is a top plan;

Fig. 5 is a bottom plan;

Fig. 6 is an enlarged fragmental view of the tape guide and support.

Fig. 7 is an enlarged bottom plan of a portion of the casing showing the scriber; and Fig. 8 is a detail in perspective of the detachable centering means.

Referring more particularly to the drawings, wherein similar characters of reference designate like and corresponding parts throughout the various views, 10 designates in its entirety the casing of my invention, the same having side walls 11 and a peripheral wall 12. The side walls 11 are provided with enlarged right-angular portions 13, and the peripheral wall 12 is provided with portions 14 and 15 corresponding to the shape of the side walls 11.

The tape carrying reel is in the form of a drum 16, said drum having a tape carrying portion 17 and an annular flange 18. The drum is mounted in an opening 19 formed in one of the side walls 11, the outer side wall having a concentric depression 20 formed therein in which is seated the head 21 of a spindle 22, said spindle having a bearing shaft 23 in threaded engagement therewith. The inner end wall of the drum 16 is provided with an opening 24 adapted to receive the depression 20, said depression acting as a bearing. To rotate the drum an arm 25 is provided, said arm being hinged at 26 on the outer face of said drum. A handle 27 is mounted on the arm 25, a flat spring 28 being mounted within the drum to engage the handle when in folded position, as best shown in Fig. 3. The tape proper is designated T and is wound upon the drum 17, said tape being trained over an anti-friction guard member D disposed circumferentially of the casing and terminating adjacent the outlet opening 29. The tape is adapted to pass through said opening, said tape being jointed as at 30 to permit folding of the same when not in use.

The extension portions 31 of the tape connect with a ring member 32, said ring member having an object engaging finger 33 formed thereon, said finger 33 serving as a pointer to permit accurate measurements.

The tape guard D is preferably formed of a strip of metal 34 having loops 35 struck therefrom, said loop encircling a transversely arranged bar 36 carried by the side walls of the casing 10. The lower ends of the strip 34 is freely movable, the same being inherently resilient, a cam roller 37 serving to engage the free end of said strip 34 to force the same into engagement with the tape gripping the same against the wall 15. A handle 38 is arranged externally of the casing 10 to manipulate said roller.

To anchor one end of the tape when taking linear measurements I provide a right-angular guide 39 pivotally mounted at 40 within the casing. An opening 41 is provided in the walls 14 and 15 adjacent their juncture to permit disposition of the pivoted guide 39. One arm 42 of said guide is adapted to be swung into the dotted line position shown in Fig. 2 so as to act as an abutment for engagement with one end of an object to be measured. An inner wall 43 is provided so as to form a chamber in which said guard is adapted to be received when not in use.

A pair of flanges 44 as shown in Fig. 7 are formed upon the walls 14 adjacent the lower ends thereof, a pencil or scriber holder 45 being retainable by said flanges, complementally arranged grooves 46 being formed in said holder 45 for engagement with said flanges. A pencil or other scriber 47 may be disposed within the holder. Normally the holder is removed from the operative position and may be carried in the pocket of the user.

As a centering means whereby the scribing of circles may be accomplished, there is provided an arm portion 51 as shown in Fig. 8, having one end thereof squared and carrying hooks 52 adapted for engagement with the tape joint 20, while the remaining or outer end is formed with an annular portion which portion carries a pin 53 as a pivot. It is obvious that the pin will securely engage an object upon which the circle is to be scribed.

To obtain accurate measurements without any calculation upon the part of the user I have provided a pair of openings 48 and 49 in the top portion of the peripheral wall 12, said openings forming a bar 50 for registration with the graduations upon said tape so as to indicate accurately the measurements made with the tape. A description of the graduations on the tape and the manner of allowing for the distance between the bar 50 and the end of the tape need not be described herein in view of the obvious manner in which this may be done. The upper free end of the guard D as shown in Fig. 2 is disposed subjacent to the bar 50 so that the tape will be caused to snugly move between said bar and said guard thus insuring accurate measurements.

When using the device the guide member 39 is moved to the position shown in dotted lines in Fig. 2. The ring member is now disengaged from the position shown in Fig. 2 and the tape withdrawn, the finger 33 being engaged over the free margin of the object being measured. The correct measurement in feet or any other denominating units will be shown adjacent the bar 50 in alinement therewith.

To describe circles or arc thereof the scriber is inserted into position as shown in dotted lines in Fig. 2, the guide member 39 being permitted to remain in its chamber. The tape is withdrawn and the finger 33 is engaged at the desired point. The casing carrying the scriber is now moved across the object on which the circle is to be scribed or struck, a correct measurement being afforded. I desire to direct attention that the point of the scriber is in exact alinement with the outer surface of the wall 14 so that the measurements obtained by the scriber will coincide with linear measurements obtained by the guide 39. When the proper measurement is had the arm 51 is engaged with the tape joint 30 by reason of the hooks 52, and the centering pin as a pivot engaged with the object upon which the circle is to be scribed.

When the device is not in use the winding arm 25 is folded into the position as shown in Fig. 3, the guide member 39 is folded into the position shown in Fig. 2 and the finger 33 engaged with the free end of the wall 15. The spring within the drum prevents the handle from leaving the position shown thereby providing a housing therefor. The cam roller may be tightened and the device will then be ready for packing or shipping.

From the above description taken in connection with the accompanying drawing, it is thought that a clear and comprehensive understanding of the construction, operation advantages of my invention may be had, and while I have shown and described the device as embodying a specific structure, I desire that it be understood that such changes may be made in said structure as do not depart from the spirit and scope of the invention as claimed.

Having thus fully described my invention, what I claim as new and desire to secure by Letters Patent, is:—

1. In a device of the class described, the combination with a casing having a peripheral wall and a pair of right-angularly related walls forming an enlargement, said casing being provided with an opening adjacent the juncture of said walls, a guide member pivoted in said casing adjacent said opening, said guide member being adapted for movement to a position external of the casing for measuring, a drum rotatable in the casing, a bearing spindle therefor, a tape measuring device wound upon said drum, said casing having an outlet opening for said tape, and a guard mounted within the casing in spaced relation to the tape when wound upon said drum whereby to form a guide for the tape when being moved into and out of the casing.

2. In a device of the class described, the combination of a casing having a peripheral wall formed to provide a right-angular portion, side walls associated with the peripheral wall, a retaining guide pivoted at the apex of said portion, a scriber adapted for detachable attachment to said casing adjacent the guide, a tape wound within the casing, and a guiding strip circumferentially arranged over which said tape is to be trained for the purpose specified.

3. In a device of the class described, the combination of a casing having a peripheral wall formed to provide a right-angular portion, side walls associated with the peripheral wall, a retaining guide pivoted at the apex of said portion, a scriber adapted for detachable association with said casing adjacent the guide, a drum within the casing, bearing means for said drum, an operating handle to wind the drum, a tape wound on said drum and adapted to extend without the casing, a guard strip for said tape arranged circumferentially of the drum, and means for moving said strip into engagement with the tape to retain the same against movement.

4. In a device of the class described, the combination of a casing having a peripheral wall formed to provide a right-angular portion, side walls associated with the peripheral wall, a retaining guide pivotally associated with said side walls, a scriber adapted for detachable association with said casing, a drum rotatable in the casing, a bearing means for said drum, a tape to be wound on said drum, the free end of the tape being arranged externally of the casing, a guide carried by the free end of said tape, said tape being jointed for folding when not in use.

5. In a device of the class described, the combination with a casing having guide means, a drum mounted in said casing, and a tape to be wound upon said drum, of a strip guard member circumferentially arranged within the casing, the peripheral wall of said casing having a pair of openings in the upper portion thereof forming a bar, said tape being extended over said guide strip and under said bar to be exhibited through said openings, the lower free end of said guard strip being inherently resilient, and a cam member to move the free end of said strip into engagement with the tape to lock the same against movement.

6. A device of the class described, including a casing having a right-angular portion, a guide pivoted within said casing, a tape wound within the casing having an extension carried by the free end thereof, a scriber carried by said casing, and a pivot member carried by the extension on the free end of said tape.

In testimony whereof, I affix my signature hereto.

CHARLES W. CROGAN.